US008657327B2

(12) United States Patent
Kanno

(10) Patent No.: US 8,657,327 B2
(45) Date of Patent: Feb. 25, 2014

(54) VEHICLE INTERIOR PANEL, AND AIRBAG DEVICE

(75) Inventor: Yuki Kanno, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/582,378

(22) PCT Filed: Feb. 28, 2011

(86) PCT No.: PCT/JP2011/054452
§ 371 (c)(1),
(2), (4) Date: Aug. 31, 2012

(87) PCT Pub. No.: WO2011/108477
PCT Pub. Date: Sep. 9, 2011

(65) Prior Publication Data
US 2013/0001932 A1 Jan. 3, 2013

(30) Foreign Application Priority Data
Mar. 4, 2010 (JP) ................................ 2010-048397

(51) Int. Cl.
*B60R 21/205* (2011.01)
*B60R 21/215* (2011.01)
*B62D 25/14* (2006.01)

(52) U.S. Cl.
USPC ............. 280/728.3; 180/90; 280/732; 296/70

(58) Field of Classification Search
USPC ..................... 180/90; 280/728.3, 732; 296/70
See application file for complete search history.

(56) References Cited

U.S. PATENT DOCUMENTS

| 7,093,849 B2 * | 8/2006 | Nishijima et al. | 280/728.3 |
| 7,100,941 B2 * | 9/2006 | Riha et al. | 280/728.3 |
| 7,178,825 B2 * | 2/2007 | Fujii et al. | 280/728.3 |
| 7,201,434 B1 * | 4/2007 | Michalak et al. | 296/187.05 |
| 7,300,102 B2 * | 11/2007 | Gupta et al. | 296/208 |
| 7,422,261 B2 * | 9/2008 | Zellner et al. | 296/37.12 |
| 7,484,752 B2 * | 2/2009 | Yasuda et al. | 280/728.3 |

(Continued)

FOREIGN PATENT DOCUMENTS

| JP | 2004-136698 A | 5/2004 |
| JP | 2004-175305 A | 6/2004 |

(Continued)

OTHER PUBLICATIONS

International Search Report from the International Bureau of WIPO for International Application No. PCT/JP2011/054452 dated May 31, 2011 (1 page) and an English translation of the same (1 page).

*Primary Examiner* — Ruth Ilan
*Assistant Examiner* — Laura Freedman
(74) *Attorney, Agent, or Firm* — Fitch, Even, Tabin & Flannery, LLP

(57) ABSTRACT

Provided are a vehicle interior panel and an airbag device wherein it is possible to prevent the weld strength and the rigidity of a panel from deteriorating. In a vehicle interior panel, a joint surface of a flap portion has first welding ribs, second welding ribs, and a third welding rib formed thereon. The first welding ribs include the first communication grooves each allowing adjacent grids and to communicate with each other. The second welding ribs include second communication grooves each allowing adjacent grids to communicate with each other. The third welding rib includes third communication grooves formed on sides substantially perpendicular to a hinge portion. The second communication grooves are formed so as not to be successively aligned in a direction perpendicular to the second welding ribs. The first to third communication grooves form an exhaust channel allowing the air in the grids to be discharged outside during vibration welding.

7 Claims, 6 Drawing Sheets

(56) References Cited

U.S. PATENT DOCUMENTS

| | | | |
|---|---|---|---|
| 7,513,528 B2 * | 4/2009 | Penner | 280/752 |
| 7,556,285 B1 * | 7/2009 | Hayashi | 280/728.3 |
| 7,665,758 B2 * | 2/2010 | Hayashi | 280/728.3 |
| 7,934,745 B2 * | 5/2011 | Hayashi | 280/728.3 |
| 8,474,861 B1 * | 7/2013 | Twork | 280/728.3 |
| 2005/0269804 A1 * | 12/2005 | Yamada et al. | 280/728.3 |
| 2007/0029763 A1 * | 2/2007 | Hayashi | 280/728.3 |
| 2010/0078920 A1 * | 4/2010 | Terai et al. | 280/728.3 |
| 2012/0299274 A1 * | 11/2012 | Kanno | 280/728.3 |

FOREIGN PATENT DOCUMENTS

| | | | |
|---|---|---|---|
| JP | 2004-345144 A | | 12/2004 |
| JP | 2005-153545 A | | 6/2005 |
| JP | 2007-091024 A | | 4/2007 |
| JP | 2007-137239 A | | 6/2007 |
| JP | 4009226 B2 | | 11/2007 |
| JP | 2008-037375 A | | 2/2008 |
| JP | 2008265162 A | * | 11/2008 |
| JP | 2009184518 A | * | 8/2009 |
| JP | 4371780 B2 | | 11/2009 |

* cited by examiner

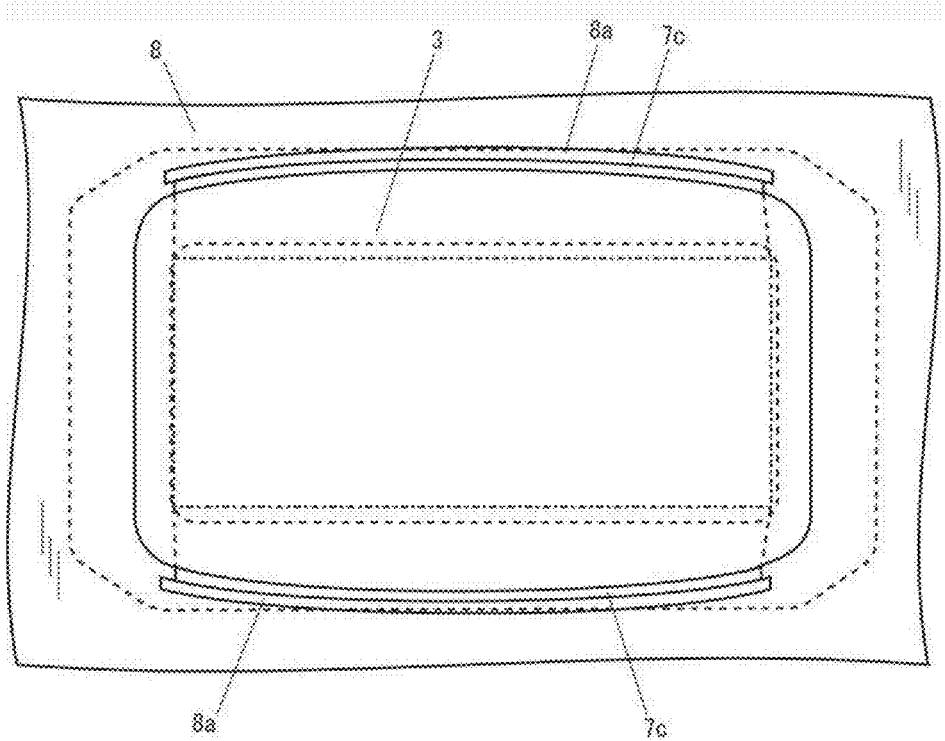

VEHICLE INTERIOR PANEL, AND AIRBAG DEVICE

CROSS-REFERENCE TO RELATED APPLICATIONS

This application is a U.S. national phase application filed under 35 U.S.C. §371 of International Application PCT/JP2011/054452, filed on Feb. 28, 2011, designating the United States, which claims priority from JP 2010-048397, filed on Mar. 4, 2010, which are hereby incorporated herein by reference in their entirety.

FIELD OF THE INVENTION

The present invention relates to a vehicle interior panel and an airbag device mounted in a vehicle, such as an automobile, and, in particular, to a vehicle interior panel and an airbag device joined by vibration welding.

BACKGROUND OF THE INVENTION

In general, a vehicle interior panel is formed by joining an inner case to an outer panel using vibration welding. The inner case has an opening for deploying an airbag and a flap portion formed together with a hinge portion in the opening. The outer panel covers the surface of the inner case and includes a door portion to be joined to the flap portion. One of joint surfaces between the flap portion and the door portion has a plurality of first welding ribs disposed substantially parallel to the hinge portion, a plurality of second welding ribs disposed so as to form a plurality of grids together with the first welding ribs, and a third welding rib formed in a frame shape thereon along the outer periphery of the door portion. By urging the first to third welding ribs against the back surface of the outer panel and vibrating the first to third welding ribs, the outer panel is welded and fixed to the inner case.

However, when the outer panel is vibration-welded to the inner case, the following problem arises. That is, the air in the grids formed by the first and second welding ribs is trapped in the grids and forms an air gap. Thus, jointing of the first and second welding ribs to the outer panel is interfered with the air gap and, therefore, the weld strength is decreased.

To solve such a problem, a vehicle interior panel with a surface skin (refer to, for example, Japanese Patent No. 4371780) has been proposed. A vehicle interior panel with a surface skin described in Japanese Patent No. 4371780 includes a base member (an outer panel), a surface skin bonded to a front surface of the base member, and a plastic structural member (an inner case) vibration-welded to the back surface of the base member. The base member has a through-hole for discharging air through a gap between the base member and the skin surface towards the back surface of the base member when the skin surface is bonded. One of the base member and the structural member has a welding rib formed thereon. The grid-shaped welding rib protrudes from one of the base member and the structural member towards the other and is vibration-welded. The welding rib has a communication channel allowing the through-hole to communicate with the outside. By using such a structure, when vibration welding is performed, the air in the grid is discharged outside through the communication channel. In this way, a decrease in the weld strength between the plastic structural member and the base member can be prevented.

SUMMARY OF THE INVENTION

However, if, like the vehicle interior panel with a surface skin described in Japanese Patent No. 4371780, a communication channel is provided in the welding rib in the longitudinal direction and the lateral direction, the rigidity of the vehicle interior panel is disadvantageously decreased. As a result, in order to prevent part of the vehicle interior panel from scattering when an airbag is inflated and deployed, excessive vibration welding needs to be performed and, therefore, the manufacturing time and cost of the vehicle interior panel are increased.

Accordingly, the present invention provides a vehicle interior panel and an airbag device capable of preventing a decrease in the weld strength and a decrease in the rigidity of the panel.

According to the present invention, a vehicle interior panel is provided. The vehicle interior panel includes an inner case including a flap portion defining an opening portion for deployment of an airbag and formed together with a hinge portion in the opening portion; and an outer panel covering a front surface of the inner case and including a door portion to be joined to the flap portion. The outer panel is joined to the inner case using vibration welding. One of joint surfaces between the flap portion and the door portion has a plurality of first welding ribs, a plurality of second welding ribs, and a third welding rib formed in a frame shape thereon along the outer periphery of the flap portion. The first welding ribs are disposed substantially parallel to the hinge portion, and the second welding ribs are disposed so as to form a plurality of grids together with the first welding ribs. The first welding ribs include first communication grooves each allowing adjacent grids to communicate with each other. The second welding ribs include second communication grooves each allowing adjacent grids to communicate with each other, and the third welding rib includes third communication grooves formed in the sides thereof substantially perpendicular to the hinge portion. The second communication grooves are formed so as not to be successively aligned in a direction perpendicular to the second welding ribs, and the first to third communication grooves form an exhaust channel allowing air in the grids to be discharged outside during vibration welding.

In addition, according to the present invention, an airbag device is provided. The airbag device includes an airbag to be inflated and deployed in case of emergency, an inflator for supplying gas to the airbag, a retainer for supporting the inflator and the airbag, and a vehicle interior panel configured to allow the retainer to be latched thereto and allow the airbag to be released in a passenger compartment of a vehicle. The vehicle interior panel includes an inner case including a flap portion defining an opening portion for deployment of an airbag and formed together with a hinge portion in the opening portion; and an outer panel covering a front surface of the inner case and including a door portion joined to the flap portion. The outer panel is joined to the inner case using vibration welding. One of the joint surfaces between the flap portion and the door portion has a plurality of first welding ribs, a plurality of second welding ribs, and a third welding rib formed in a frame shape thereon along the outer periphery of the flap portion. The first welding ribs are disposed substantially parallel to the hinge portion, and the second welding ribs are disposed so as to form a plurality of grids together with the first welding ribs. The first welding ribs include first communication grooves each allowing adjacent grids to communicate with each other. The second welding ribs include second communication grooves each allowing adjacent grids to communicate with each other, and the third welding rib includes third communication grooves formed in the sides thereof substantially perpendicular to the hinge portion. The second communication grooves are formed so as not to be successively aligned in a direction perpendicular to the second welding ribs, and the first to third communication grooves form an exhaust channel allowing air in the grids to be discharged outside during vibration welding.

In the above-described vehicle interior panel and the airbag device according to the present invention, the second communication grooves are formed, for example, at least one grid spacing away from the hinge portion.

In addition, the third communication grooves are formed, for example, at least one grid spacing away from corners of the third welding rib.

Furthermore, the second welding ribs forming a boundary of the exhaust channel need not include the second communication grooves.

The inner case may include a flange portion formed in the outer periphery of the opening portion, and the joint surface of the flange portion may include fourth welding ribs disposed substantially parallel to the first welding ribs, fifth welding ribs disposed substantially parallel to the second welding ribs, a sixth welding rib formed in a frame shape along the outer periphery of the flange portion, and a seventh welding rib formed in a frame shape along the inner periphery of the flange portion. The fourth to sixth welding ribs may respectively have fourth to sixth communication grooves allowing the air in the grids formed with the fourth to seventh welding ribs to be discharged outside.

In addition, on the joint surface of the flange portion located outside of the hinge portion, the fourth welding ribs may include fourth communication grooves allowing adjacent grids to communicate with each other, and the fifth welding ribs may include fifth communication grooves allowing adjacent grids to communicate with each other, and the fifth communication grooves may be formed so as not to be successively aligned in a direction perpendicular to the fifth welding ribs.

According to the above-described vehicle interior panel and the airbag device of the present invention, air in the grids can be released to the outside through the exhaust channel when vibration welding is performed and, thus, a decrease in the weld strength between the outer panel and the inner case can be prevented. In addition, since the second communication grooves are formed so as not to be successively aligned in a direction perpendicular to the second welding ribs, the strength in the direction of the second welding ribs can be increased. Thus, a decrease in the rigidity of the entire panel can be prevented. In addition, the need for excessive vibration welding can be eliminated and, therefore, the vehicle interior panel and the airbag device can be easily manufactured.

Furthermore, by forming the second communication grooves at least one grid spacing away from the hinge portion, the strength of a portion adjacent to the hinge portion to which a high stress is applied when the airbag is inflated and deployed can be effectively increased and, therefore, the rigidity of the panel can be increased.

Still furthermore, by forming the third communication grooves at least one grid spacing away from corners of the third welding rib, the strength of corners of the door portion to which a large external force tends to be applied when the airbag is inflated and deployed can be effectively increased and, therefore, the rigidity of the panel can be increased.

Yet still furthermore, by not forming the second communication grooves in the second welding ribs forming a boundary of the exhaust channel, a plurality of the exhaust channels can be easily formed and, therefore, a desired exhaust channel can be easily designed. In addition, by forming the second welding ribs without having such second communication grooves, the weld strength can be partially increased. Therefore, the rigidity of the panel can be increased.

Yet still furthermore, even when the flange portion formed in the outer periphery of the inner case has the fourth to seventh welding ribs formed therein, the air in the grids formed with the fourth to seventh welding ribs can be easily discharged outside by forming predetermined communication grooves in the fourth to sixth welding ribs. In this way, a decrease in the weld strength of the flange portion can be prevented.

Yet still furthermore, by forming the fifth communication grooves on the joint surface of the flange portion located outside of the hinge portion so as not to be successively aligned in a direction perpendicular to the fifth welding ribs, the strength of the flange portion in a direction in which the fifth welding ribs are formed can be increased. In this way, a decrease in the rigidity of the entire panel can be prevented.

BRIEF DESCRIPTION OF THE DRAWINGS

FIGS. 1(A) and 1(B) illustrate an airbag device according to an embodiment of the present invention, wherein FIG. 1(A) is a cross-sectional view of the airbag device, and FIG. 1(B) is a front view of the airbag device.

FIGS. 2(A) and 2(B) illustrate an inner case illustrated in FIGS. 1(A) and 1(B), wherein FIG. 2(A) is a front view of the inner case, and FIG. 2(B) is a back view of the inner case.

FIGS. 5(A)-5(D) illustrate the operation performed by the airbag device illustrated in FIGS. 1(A) and 1(B) when an airbag is deployed, wherein FIG. 5(A) illustrates an initial airbag inflation stage, FIG. 5(B) illustrates an outer panel breaking-open stage, FIG. 5(C) illustrates a door portion rotation stage, and FIG. 5(D) illustrates a door portion rotation completion stage.

FIG. 6 is a front view of the airbag device in a mode illustrated in FIG. 5(C).

FIGS. 7(A) and 7(B) illustrate modifications of the vehicle interior panel according to the present invention, wherein FIG. 7(A) illustrates a first modification, and FIG. 7(B) illustrates a second modification.

DETAILED DESCRIPTION OF THE PREFERRED EMBODIMENTS

Figure 1A:
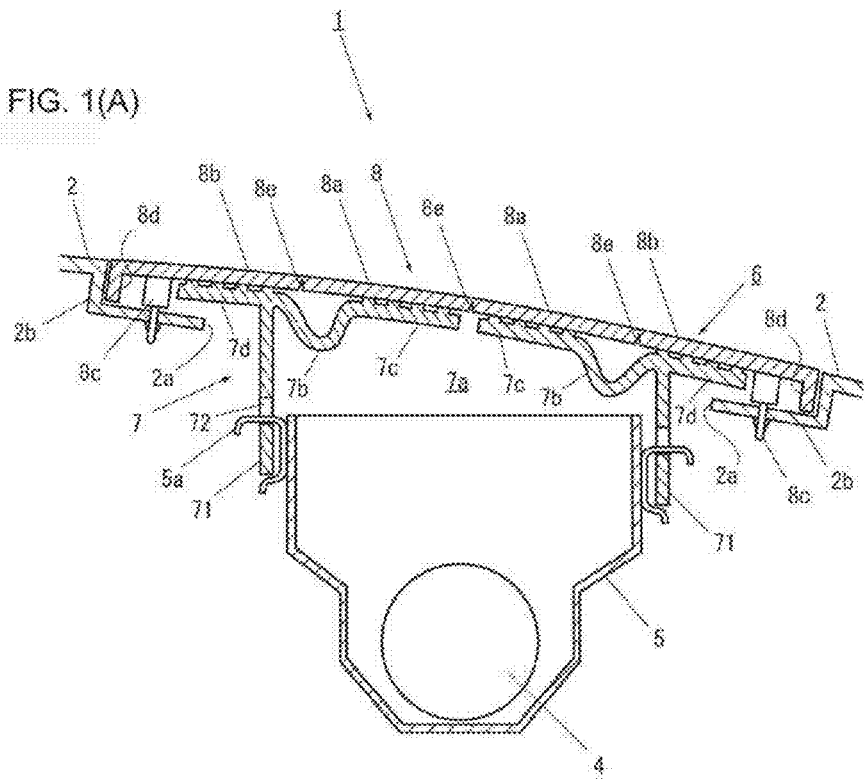
Figure 1B:
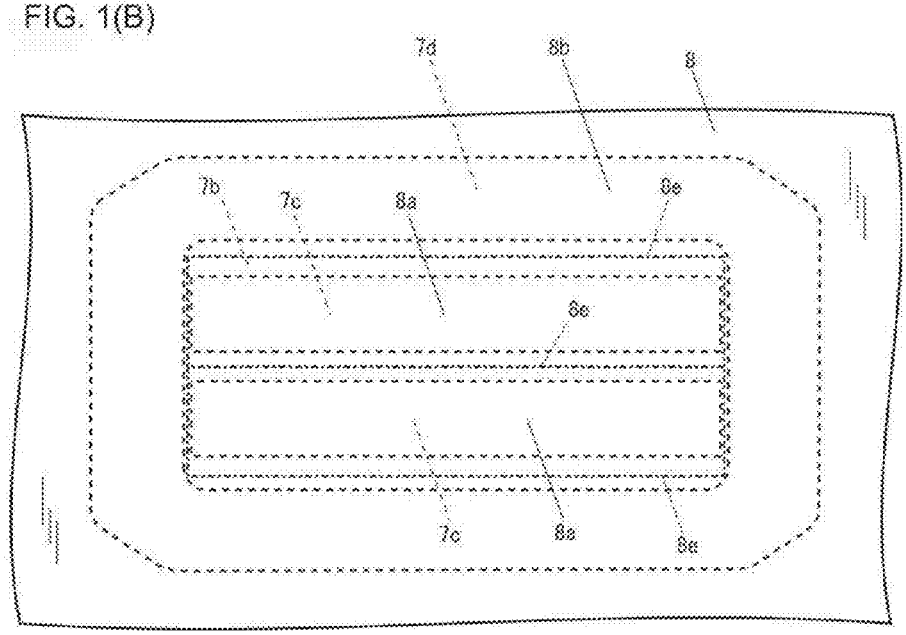
Figure 2A:
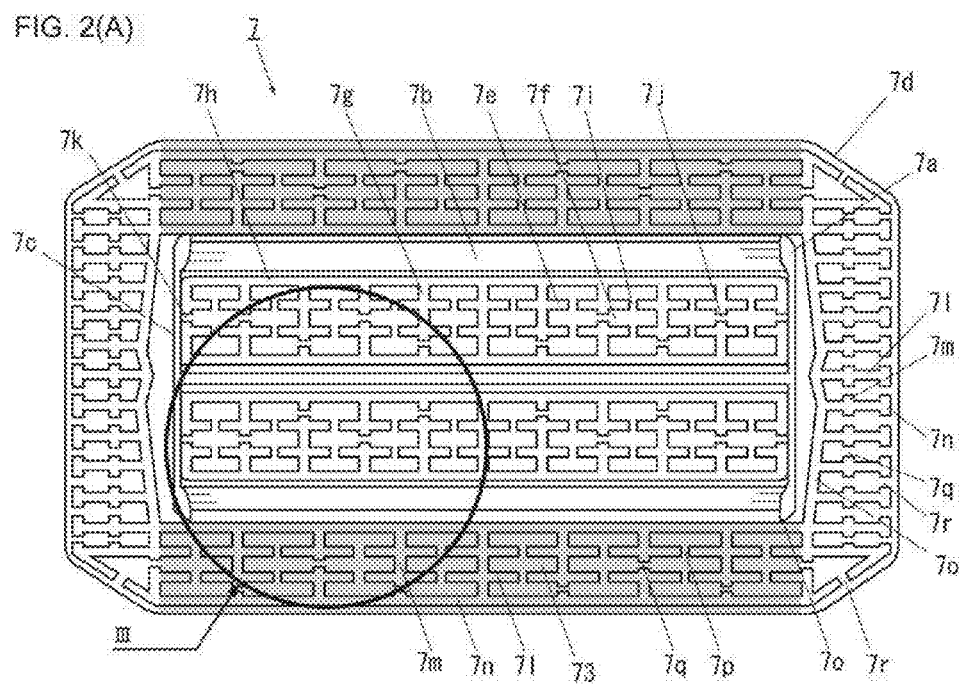
Figure 2B:
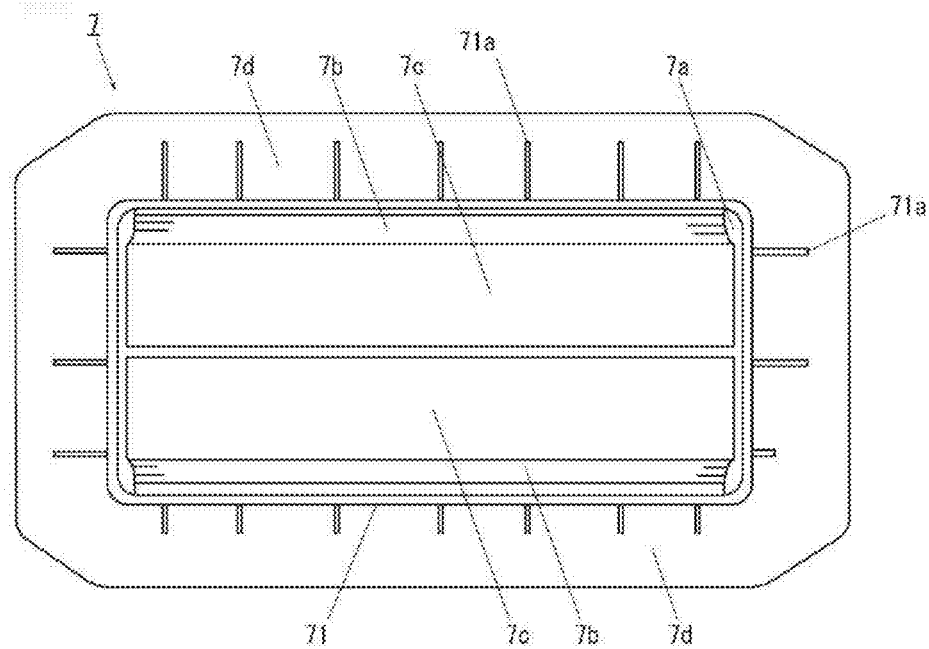
Figure 3:
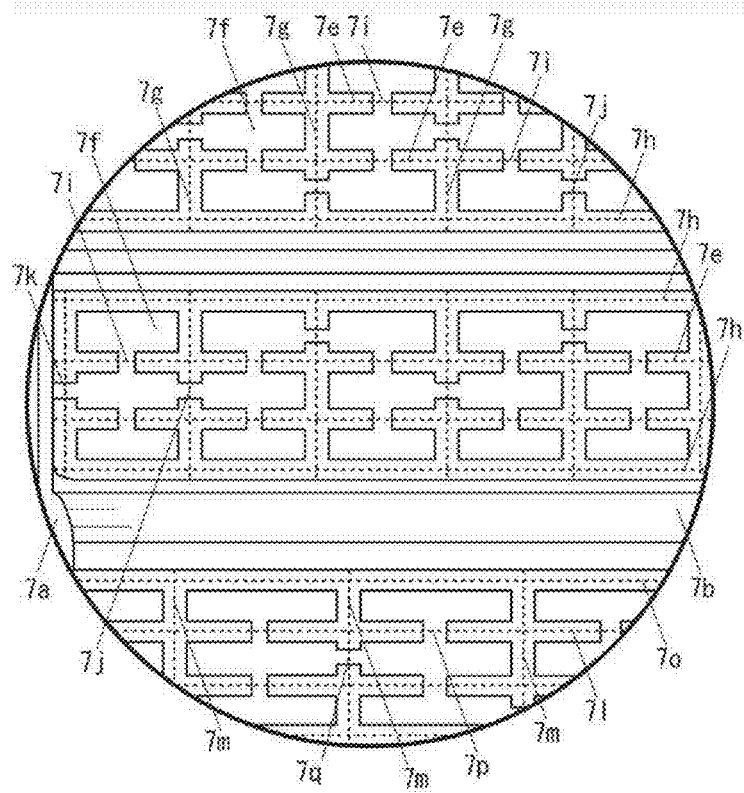
FIG. 3 is an enlarged view of a portion indicated by III in FIG. 2(A).

An airbag device and a vehicle interior panel according to an embodiment of the present invention are described below with reference to FIGS. 1-6. FIGS. 1(A) and 1(B) illustrate the airbag device according to an embodiment of the present invention, wherein FIG. 1(A) is a cross-sectional view of the airbag device, and FIG. 1(B) is a front view of the airbag device. In addition, FIGS. 2(A) and 2(B) illustrate an inner case illustrated in FIGS. 1(A) and 1(B), wherein FIG. 2(A) is a front view of the inner case, and FIG. 2(B) is a back view of the inner case. FIG. 3 is an enlarged view of a portion indicated by III in FIG. 2(A). Note that an airbag device 1 illustrated in FIGS. 1(A) and 1(B) represents an embodiment obtained when the present invention is applied to a passenger airbag device that is incorporated into an instrument panel 2 disposed in front of the passenger seat on the side adjacent to the vehicle body.

As illustrated in FIGS. 1(A) and 1(B), the airbag device 1 according to the present embodiment includes an airbag 3 to be inflated and deployed in case of emergency (refer to FIGS. 5(A)-5(D)), an inflator 4 for supplying gas to the airbag 3, a retainer 5 for supporting the inflator 4 and the airbag 3, and a vehicle interior panel 6 configured so as to be capable of latching the retainer 5 and releasing the airbag 3 into the passenger compartment of a vehicle. Note that in FIG. 1(A), for convenience of description, the airbag 3 is not illustrated. In addition, instead of placing the inflator 4 in the retainer 5, the inflator 4 may be attached to the exterior of the retainer 5 and be supported by the retainer 5.

The vehicle interior panel 6 is formed from an inner case 7 and an outer panel 8 joined by vibration welding. The inner case 7 has flap portions 7c forming an opening portion 7a for releasing an airbag. Each of the flap portions 7c is formed together with a hinge portion 7b in the opening portion 7a. The inner case 7 further has a flange portion 7d formed in the outer periphery of the opening portion 7a. The outer panel 8 covers the surface of the inner case 7. The outer panel 8 includes a door portion 8a joined to the flap portion 7c. The joint surface of the flap portion 7c has a plurality of first welding ribs 7e formed thereon, each being disposed substantially parallel to the hinge portion 7b, a plurality of second welding ribs 7g formed thereon so as to form a plurality of grids 7f together with the first welding ribs 7e, and a third welding rib 7h formed in a frame shape thereon along the outer periphery of the flap portion 7c. Each of the first welding ribs 7e includes first communication grooves 7i allowing two adjacent grids 7f and 7f to communicate with each other. Each of the second welding ribs 7g includes a second communication groove 7j allowing two adjacent grids 7f and 7f to communicate with each other. The third welding rib 7h includes third communication grooves 7k formed in the sides thereof substantially perpendicular to the hinge portions 7b. At that time, the second communication grooves 7j are formed so as not to be successively aligned in a direction perpendicular to the second welding ribs 7g. The first to third communication grooves 7i-7k form an exhaust channel allowing the air in the grids 7f to be discharged outside during vibration welding. Note that in the partially enlarged view in FIG. 3, for the sake of better understanding of the welding ribs and communication grooves, a direction in which each of the welding ribs is formed is indicated by a dashed line.

In general, the instrument panel 2 is tilted so that the front end of the instrument panel 2 is higher than the rear end in the front-rear direction of the vehicle. The instrument panel 2 has a substantially rectangular opening portion 2a formed in the middle thereof. The rectangular opening portion 2a is used for releasing the airbag. In addition, the instrument panel 2 has a recess portion 2b in the outer periphery of the opening portion 2a. The recess portion 2b is used for mounting the outer panel 8. The recess portion 2b has a plurality of fastener holes into which a plurality of clips 8c provided on the outer panel 8 are inserted. As illustrated in FIG. 1(A), the recess portion 2b is formed so as to extend in a direction substantially perpendicular to the tilted surface of the instrument panel 2. However, the structure of the recess portion 2b is not limited thereto. For example, the recess portion 2b may be formed so as to extend in the substantially vertical direction. When the outer panel 8 is fitted into the recess portion 2b, the outer panel 8 covers the opening portion 2a of the instrument panel 2. Accordingly, the surface of the outer panel 8 serves as an interior surface of the vehicle. That is, the front surface of the outer panel 8 serves as a vehicle interior surface and forms part of the vehicle interior panel 6 (on the front surface side). While the present embodiment has been described with reference to the instrument panel 2 formed from a member that differs from the member of the outer panel 8, the outer panel 8 and the instrument panel 2 may be integrated into one body.

The inner case 7 is vibration-welded to the back surface of the outer panel 8. Thus, the inner case 7 forms part of the vehicle interior panel 6 (on the back surface side). The inner case 7 having such a structure has a function of latching the retainer 5 and a function of supporting the door portion 8a of the outer panel 8 that is broken open during inflation of the airbag 3. As illustrated in FIG. 1(A), the inner case 7 has a side wall 71 that is formed in a rectangular shape and that forms the opening portion 7a for releasing the airbag. The side wall 71 has a plurality of latching holes 72 therein. Thus, hooks 5a connected to the retainer 5 are latched. In addition, as illustrated in FIG. 2(B), a plurality of reinforcing ribs 71a are formed in the outer periphery of the side wall 71.

In addition, as illustrated in FIGS. 1 and 2, the inner case 7 includes the flange portion 7d welded to a fixing portion 8b of the outer panel 8, a pair of the flap portions 7c welded to the door portions 8a, and a pair of the hinge portions 7b each formed between the flange portion 7d and one of the two flap portions 7c. The hinge portion 7b has, for example, a substantially U-shaped cross section so as to be convex towards the vehicle body. The hinge portion 7b allows the door portion 8a of the outer panel 8 to open in a double door fashion without breaking into pieces when the airbag 3 is inflated.

As illustrated in FIGS. 2(A) and 3, the joint surface of the flap portion 7c has the first welding ribs 7e, the second welding ribs 7g, and the third welding rib 7h formed thereon. The first to third welding ribs 7e-7h form a plurality of substantially grid-shaped spaces (the grids 70. According to the present invention, a plurality of communication grooves are formed so that the grids 7f do not form closed spaces when vibration welding is performed and, therefore, an escape route of the air (the exhaust channel) is formed. Note that the number and shape of the first and second welding ribs 7e and 7g are not limited to those illustrated in the drawings. The numbers and the shapes (e.g., the heights and widths) can be set to appropriate numbers and shapes in accordance with the conditions, such as the type, the size, and the internal pressure of the airbag 3 and a stress applied to the joint surface of the vehicle interior panel 6.

The first welding ribs 7e are disposed substantially parallel to the hinge portion 7b and has a function of maintaining the weld strengths of the flap portions 7c in a rotational direction (the longitudinal direction in the drawings) and the substantially perpendicular direction (the lateral direction in the drawings). When the airbag 3 is inflated, the load imposed in the direction in which the first welding ribs 7e are formed (the lateral direction in the drawings) is lower than the load imposed in the rotational direction of the flap portion 7c (the longitudinal direction in the drawings). Accordingly, even when the first communication grooves 7i are formed so as to longitudinally pass through the plurality of first welding ribs 7e, the first communication grooves 7i negligibly decrease the rigidity of the vehicle interior panel 6. Therefore, each of the first communication grooves 7i is formed so as to allow adjacent grids (7f, 7f) to communicate with each other. However, the first communication grooves 7i are formed so as not to longitudinally pass through the third welding rib 7h. Since the third welding rib 7h is a portion that maintains the rigidity of the outer periphery of the flap portion 7c, it is not desirable that the first communication grooves 7i longitudinally pass through the third welding rib 7h.

The second welding ribs 7g are formed so as to be substantially perpendicular to the hinge portion 7b and have a function of maintaining the weld strengths of the flap portions 7c in the rotational direction (the longitudinal direction in the drawings). When the airbag 3 is inflated, the load imposed in the direction in which the second welding ribs 7g are formed (the longitudinal direction in the drawings) is high. Accordingly, if the second communication grooves 7j are formed so as to longitudinally pass through the plurality of second welding ribs 7g, the rigidity of the vehicle interior panel 6 is excessively decreased. Therefore, the second communication grooves 7j are formed so as not to be successively aligned in a direction perpendicular to the second welding ribs 7g (the lateral direction in the drawings). More specifically, for example, the second communication grooves 7j are formed in every other second welding rib 7g, in every two second welding ribs 7g, or in every three second welding ribs 7g. As a result, the second communication grooves 7j are formed so that two adjacent second communication grooves 7j are separated from each other by at least one grid spacing of the grid 7f in a direction in which the second welding ribs 7g are formed (the longitudinal direction in the drawings).

In addition, the second communication grooves 7j are formed at least one grid spacing away from the hinge portion 7b. In this way, the strength of a portion of the flap portion 7c that is adjacent to the hinge portion 7b and that has a large stress applied thereto when the airbag 3 is inflated can be increased. Furthermore, by forming the second communication grooves 7j in the top end region of the flap portion 7c, the strength of the top end region of the flap portion 7c is made lower than the strength of the end region adjacent to the hinge portion 7b. Accordingly, the top end region of the flap portion 7c can be easily bent. Thus, the flap portion 7c can have a resiliency that is suitable for inflation of the airbag 3.

In addition, the second welding ribs 7g forming a boundary of the exhaust channel and located in substantially the middle of the flap portion 7c do not have the second communication grooves 7j. In this way, by disposing the second welding ribs 7g that do not have the second communication grooves 7j, a plurality of the exhaust channels can be easily formed and, therefore, the air in the grids 7f can be discharged outside in any direction.

The third welding rib 7h is formed in a frame shape along the outer periphery of the flap portion 7c. Accordingly, if a communication groove is not formed at some point of the third welding rib 7h, the air in the grids 7f cannot be discharged outside even when the first and second communication grooves 7i and 7j are formed. Therefore, according to the present embodiment, the third communication grooves 7k are formed in substantially the middle of sides of the third welding rib 7h substantially perpendicular to the hinge portion 7b. The sides of the third welding rib 7h substantially parallel to the hinge portion 7b are adjacent to the hinge portion 7b and form the top end of the flap portion 7c. The stress and an external force are easily applied to those portions when the airbag 3 is inflated. Accordingly, it is not desirable that the third communication grooves 7k be formed in the sides substantially parallel to the hinge portion 7b. Therefore, the third communication grooves 7k are formed in the sides substantially perpendicular to the hinge portion 7b.

In addition, the stress and an external force are easily applied to corners of the flap portion 7c when the airbag 3 is inflated and deployed. Accordingly, it is desirable that the third communication grooves 7k be formed at least one grid spacing away from corners of the third welding rib 7h. As a result, according to the present embodiment, the third communication grooves 7k are formed in substantially the middle of sides of the third welding rib 7h perpendicular to the hinge portion 7b.

Furthermore, the inner case 7 has the flange portion 7d formed in the outer periphery of the opening portion 7a. The joint surface of the flange portion 7d has fourth welding ribs 7l disposed substantially parallel to the first welding ribs 7e, fifth welding ribs 7m disposed substantially parallel to the second welding ribs 7g, a sixth welding rib 7n formed in a frame shape along the outer periphery of the flange portion 7d, and a seventh welding rib 7o formed in a frame shape along the inner periphery of the flange portion 7d. The fourth to sixth welding ribs 7l-7n respectively have fourth to sixth communication grooves 7p-7r allowing air in the grids formed with the fourth to seventh welding ribs 7l-7o to be discharged outside during vibration welding.

As illustrated in FIGS. 1(B) and 2(A), the flange portion 7d is formed so as to surround the outer periphery of the opening portion 7a. The flange portion 7d is connected to the flap portions 7c through the hinge portions 7b. In addition, in a portion with hatchings in FIG. 2(A), that is, on a joint surface 73 of the flange portion 7d located outside of the hinge portion 7b, the fourth welding ribs 7l include the fourth communication grooves 7p each allowing the adjacent grids 7f and 7f to communicate with each other. In addition, the fifth welding ribs 7m include fifth communication grooves 7q each allowing the adjacent grids 7f and 7f to communicate with each other. The fifth communication grooves 7q are formed so as not to be successively aligned in a direction perpendicular to the fifth welding ribs 7m. The joint surface 73 having such a structure is considered as an extension of the flap portions 7c and, thus, a high stress is applied to the joint surface 73 when the airbag 3 is inflated and deployed. Accordingly, as in the first to third communication grooves 7i-7k formed in the flap portion 7c, the communication grooves are formed.

In contrast, since the stress applied to the joint surface of the flange portion 7d other than the joint surface 73 when the airbag 3 is inflated and deployed is lower than that applied to the joint surface 73, only formation of an exhaust channel that prevents the air in the grid 7f from being trapped is adequate. Accordingly, as illustrated in FIG. 2(A), according to the present embodiment, only the fifth communication grooves 7q can be formed on the joint surface of the flange portion 7d other than the joint surface 73 without forming the fourth communication grooves 7p. Alternatively, the fifth communication grooves 7q may be successively formed. Still alternatively, as in the joint surface 73, the fourth to sixth communication grooves 7p-7r may be also formed on the joint surface of the flange portion 7d other than the joint surface 73. Note that the seventh welding rib 7o surrounding the opening portion 7a requires high rigidity. Accordingly, it is desirable that a communication grooves not be formed in the seventh welding rib 7o, and the air in the grids 7f be discharged outside through the sixth communication grooves 7r appropriately formed in the sixth welding rib 7n.

The outer panel 8 is mounted to the recess portion 2b so as to cover the opening portion 2a. The outer panel 8 is fixed to the instrument panel 2 using the clips 8c. Accordingly, a frame portion 8d that serves as the outer peripheral portion of the outer panel 8 is formed so as to have a shape that fits the shape of the recess portion 2b of the instrument panel 2. More specifically, in the present embodiment illustrated in FIG. 1(A), the frame portion 8d is formed so as to be substantially perpendicular to the tilted surface of the instrument panel 2. In addition, in order to easily break the outer panel 8 when the airbag is inflated and deployed, a plurality of notches 8e are formed in the surface of the outer panel 8 adjacent to the vehicle body. The outer panel 8 is partitioned into the fixing portion 8b and a pair of the door portions 8a by the notches 8e. The notches 8e serve as so-called tear lines.

The above-described inner case 7 and outer panel 8 are vibration welded to each other through, for example, the following steps: (I) the outer panel 8 is placed on a base of a vibration welding machine with the inner surface thereof (the surface adjacent to the vehicle body) facing upward, (2) the inner case 7 is placed on the outer panel 8 with the joint surface thereof facing downward, (3) the joint surface of the inner case 7 is urged downward from the above against the base by the vibration welding machine and, thus, the inner case 7 is pressed, and (4) the inner case 7 is reciprocally vibrated in a predetermined direction by the vibration welding machine under the pressure and, subsequently, the inner case 7 is reciprocally vibrated at a predetermined frequency for a predetermined period of time. Thus, a plastic is welted due to friction heat, and the joint surface of the inner case 7 is welded to the outer panel 8. Note that the vibration welding conditions (e.g., the frequency, the period of time, and the amplitude of vibration) varies with the type of the plastic to be welded and the type of product. Accordingly, any values can be set. Instead of using a vibration welding machine, an ultrasonic welding machine may be used.

Figure 4:
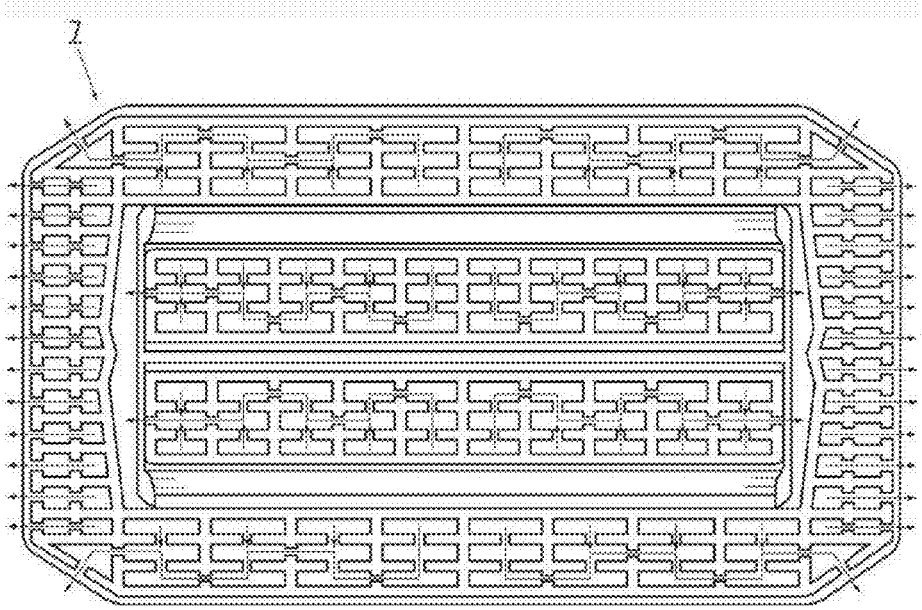
FIG. 4 illustrates an exhaust channel allowing the air in grids of the inner case to be discharged during a vibration welding process.

FIG. 4 illustrates the exhaust channel that allows the air in the grids of the inner case to be discharged during a vibration welding process. According to the above-described embodiment of the present invention, the above-described communication grooves are formed in each of the welding ribs. Thus, an escape route of the air can be generated along the exhaust channel indicated by the arrow in FIG. 4 and, therefore, the air in the grids 7*f* can be discharged outside during vibration welding. Accordingly, the air in the grids 7*f* is not trapped and, therefore, the air does not enter between the joint surfaces of the inner case 7 and the outer panel 8. As a result, a decrease in the weld strength and a variation in the weld strength can be prevented. In addition, excessive vibration welding need not be performed, and the vehicle interior panel 6 can be manufactured with less effort than ever before. Consequently, the time and cost required for manufacturing the vehicle interior panel can be reduced.

Figure 5A:
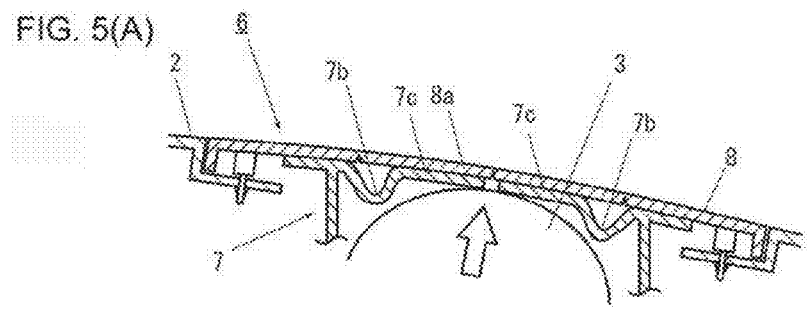
Figure 5B:
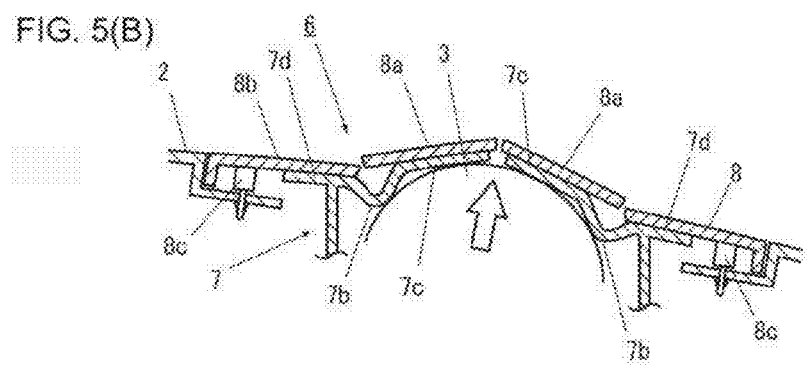
Figure 5C:
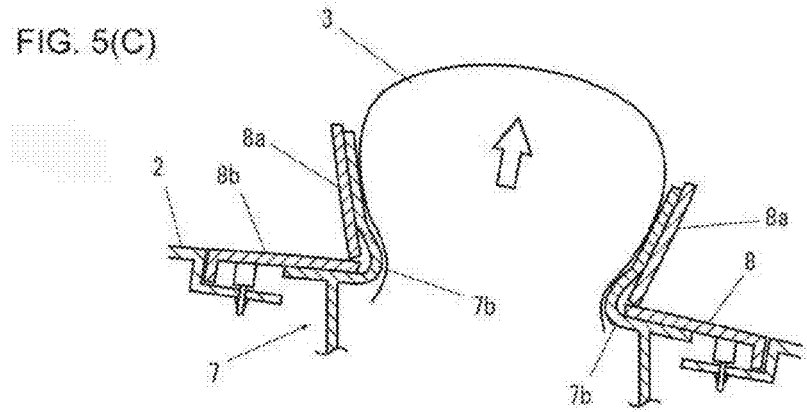
Figure 5D:
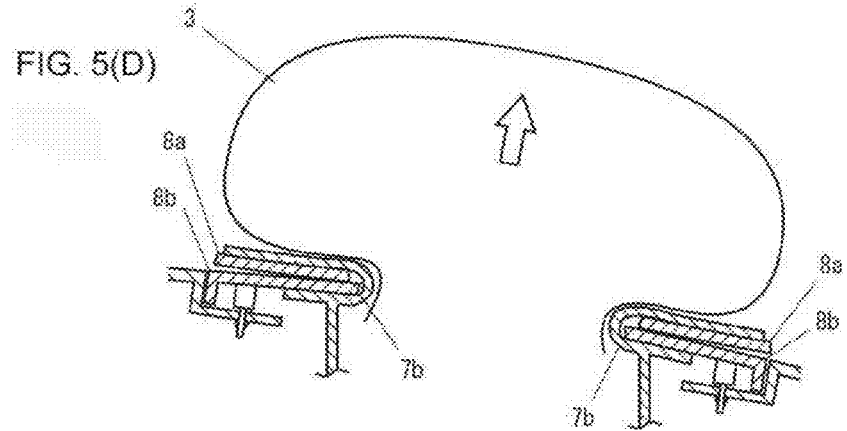

The inflation and deployment operation performed by the airbag 3 of the airbag device 1 illustrated in FIGS. 1(A) and 1(B) is described next with reference to FIGS. 5 and 6. FIGS. 5(A)-5(D) illustrate the operation performed by the airbag device illustrated in FIGS. 1(A) and 1(B) when an airbag is deployed, wherein FIG. 5(A) illustrates an initial airbag inflation stage, FIG. 5(B) illustrates an outer panel breaking-open stage, FIG. 5(C) illustrates a door portion rotation stage, and FIG. 5(D) illustrates a door portion rotation completion stage. FIG. 6 is a front view of the airbag device in a mode illustrated in FIG. 5(C).

In the initial airbag inflation stage illustrated in FIG. 5(A), the airbag 3 inflates in the inner case 7 and presses the joint surface of the vehicle interior panel 6. Upon receiving a predetermined signal from an ECU (electronic control unit) that senses or detects, for example, collision of the vehicle, the airbag device 1 supplies gas from the inflator 4 to the airbag 3. The airbag 3 inflates in a direction indicated by the arrow. Subsequently, the airbag 3 is brought into contact with the flap portions 7*c* of the inner case 7 and presses the flap portions 7*c*.

In the outer panel breaking-open stage illustrated in FIG. 5(B), the airbag 3 presses the joint surface of the vehicle interior panel 6 and, thus, the outer panel 8 is broken open into the fixing portion 8*b* and a pair of door portions 8*a*. At that time, the depths of the notches 8*e* and the thickness of the outer panel 8 are set so that the notches 8*e* formed between the door portion 8*a* and the door portion 8*a* are broken open more easily than the notches 8*e* formed between the fixing portion 8*b* and the door portion 8*a*. In addition, the door portion 8*a* of the outer panel 8 is finally separated from the fixing portion 8*b*. However, the flap portion 7*c* of the inner case 7 is still connected to the door portion 8*a* through the hinge portion 7*b*. Thus, the door portion 8*a* is not scattered around.

In the door portion rotation stage illustrated in FIG. 5(C), the door portion 8*a* rotates about the hinge portion 7*b* toward the fixing portion 8*b* as the airbag 3 inflates. At that time, the hinge portion 7*b* is urged upward by the inflation of the airbag 3 and is moved upward. In addition, the flap portion 7*c* has the first to third welding ribs 7*e*-7*h* formed thereon. Furthermore, the welding ribs have the first to third communication grooves 7*i*-7*k* formed therein. Accordingly, as illustrated in FIG. 6, the top end region of the flap portion 7*c* is broken open by the pressing force of the airbag 3 while appropriately deflecting. Thus, damage of the flap portion 7*c* can be prevented. In contrast, the portion of the flap portion 7*c* adjacent to the hinge portion 7*b* has a strength higher than that of the top end region of the flap portion 7*c* and, thus, is negligibly deflected. Accordingly, the stress applied to the hinge portion 7*b* can be reduced and, therefore, damage of the hinge portion 7*b* can be prevented. As described above, according to an embodiment of the present invention, the vehicle interior panel 6 can easily have a weld strength and rigidity of the joint surface that are necessary and sufficient for inflation and deployment of the airbag 3.

In the door portion rotation completion stage illustrated in FIG. 5(D), the door portion 8*a* is bent toward the fixing portion 8*b*. In this stage, even when the door portion 8*a* is brought into contact with the fixing portion 8*b* due to the rotation of the door portion 8*a*, the joint surfaces between the door portion 8*a* and the flap portion 7*c* are uniformly and firmly vibration-welded to each other and have certain rigidity. Thus, break-away of the joint surfaces or damage of part of the joint surfaces caused by impact of contact can be prevented.

Figure 7A:
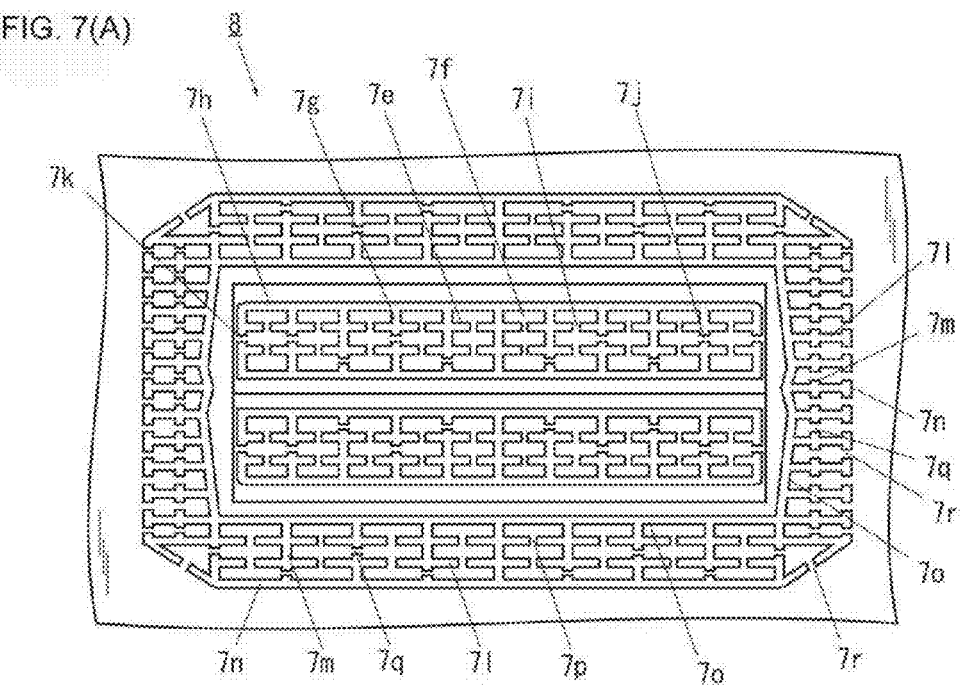
Figure 7B:
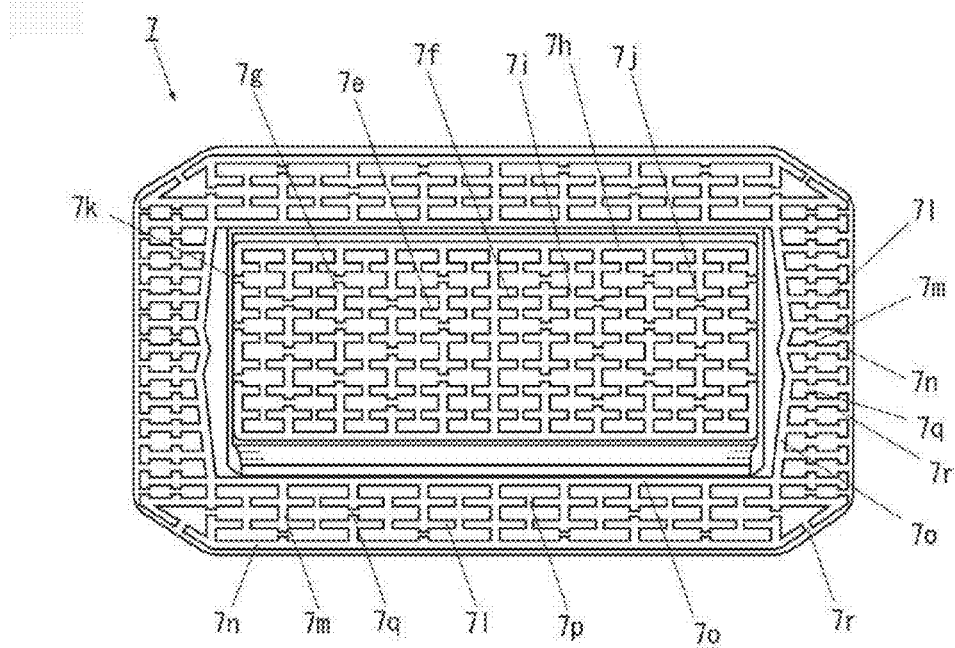

Modifications of the vehicle interior panel 6 used in the above-described embodiment of the present invention is described next with reference to FIGS. 7(A) and 7(B). FIGS. 7(A) and 7(B) illustrate modifications of the vehicle interior panel according to the present invention, wherein FIG. 7(A) illustrates a first modification, and FIG. 7(B) illustrates a second modification. Note that the same numbering is used for elements which were previously illustrated in the above-described embodiment, and description of the elements is not repeated.

FIG. 7(A) illustrates the back surface (the joint surface) of the outer panel 8. That is, according to a first modification of the vehicle interior panel 6, the joint surface (the back surface) of the outer panel 8 has the first to seventh welding ribs 7*e*-7*o* and the first to sixth communication grooves 7*i*-7*r* formed thereon. Even in such a first modification, advantages that are the same as the advantages of the above-described embodiment can be provided. In addition, although not illustrated, each of the flap portions 7*c* of the inner case 7 may have the first to third welding ribs 7*e*-7*h* and the first to third communication grooves 7*i*-7*k* formed thereon, and the joint surface of the outer panel 8 may have the fourth to seventh welding ribs 7*l*-7*o* and the sixth communication grooves 7*r* formed thereon. Alternatively, a pattern that is the reverse of the above-described pattern may be employed.

FIG. 7(B) illustrates the joint surface of the inner case 7. That is, according to a second modification of the vehicle interior panel 6, the present invention is applied when the door portion 8*a* of the outer panel 8 serves as a single swing door. Accordingly, the number of the flap portions 7*c* of the inner case 7 is one, and the hinge portion 7*b* is formed at one point. Even in such a structure, like the above-described embodiment, the flap portion 7*c* can have the first to seventh welding ribs 7*e*-7*o* and the first to sixth communication grooves 7*i*-7*r* formed thereon. In addition, if, as illustrated in FIG. 7(B), the area of the joint surface of the flap portion 7*c* is large, a plurality of the second communication grooves 7*j* may be formed in each of the second welding ribs 7*g*. Alternatively, a plurality of the third communication grooves 7*k* may be formed. However, it is desirable that the second communication grooves 7*j* be formed so as not to be successively aligned in a direction in which the first welding ribs 7*e* are formed and that the second communication grooves 7*j* be formed so as to be separated from each other by at least one spacing of the grid 7*f* in a direction in which the second welding ribs 7*g* are formed and, thus, be formed so as not to be successively aligned.

The present invention is not limited to the above-described embodiments. For example, the present invention may be applied to airbag devices other than a passenger airbag device. It will be evident that various modifications and changes may be made without departing from the broader spirit and scope of the invention. For example, the first modification may be combined with the second modification as needed.

What is claimed is:

1. A vehicle interior panel comprising:
   an inner case including at least one flap portion defining an opening portion for deployment of an airbag and formed together with a hinge portion in the opening portion; and
   an outer panel covering a front surface of the inner case and including at least one door portion to be joined to the flap portion, the outer panel being joined to the inner case using vibration welding;
   wherein one of joint surfaces between the flap portion and the door portion has a plurality of first welding ribs disposed substantially parallel to the hinge portion, a plurality of second welding ribs disposed so as to form a plurality of grids together with the first welding ribs, and a third welding rib formed in a frame shape thereon along an outer periphery of the flap portion;
   wherein the first welding ribs include first communication grooves each allowing adjacent grids to communicate with each other, the second welding ribs include second communication grooves each allowing adjacent grids to communicate with each other, and the third welding rib includes sides perpendicular to the hinge portion and further includes third communication grooves formed in the sides;
   wherein the second communication grooves are formed so as not to be successively aligned in a direction perpendicular to the second welding ribs; and
   wherein the first to third communication grooves form an exhaust channel allowing air in the grids to be discharged outside during vibration welding.

2. The vehicle interior panel according to claim 1, wherein the second communication grooves are formed at least one grid spacing away from the hinge portion.

3. The vehicle interior panel according to claim 1, wherein the third communication grooves are formed at least one grid spacing away from corners of the third welding rib.

4. The vehicle interior panel according to claim 1, wherein the second welding ribs forming a boundary of the exhaust channel do not include the second communication grooves.

5. The vehicle interior panel according to claim 1,
   wherein the inner case includes a flange portion formed in an outer periphery of the opening portion;
   wherein a joint surface of the flange portion includes fourth welding ribs disposed substantially parallel to the first welding ribs, fifth welding ribs disposed substantially parallel to the second welding ribs, a sixth welding rib formed in a frame shape along an outer periphery of the flange portion, and a seventh welding rib formed in a frame shape along an inner periphery of the flange portion; and
   wherein the fourth to sixth welding ribs respectively have fourth to sixth communication grooves allowing air in grids formed with the fourth to seventh welding ribs to be discharged outside.

6. The vehicle interior panel according to claim 5,
   wherein on the joint surface of the flange portion located outside of the hinge portion, the fourth welding ribs include fourth communication grooves each allowing adjacent grids to communicate with each other, and the fifth welding ribs include fifth communication grooves each allowing adjacent grids to communicate with each other; and
   wherein the fifth communication grooves are formed so as not to be successively aligned in a direction perpendicular to the fifth welding ribs.

7. An airbag device comprising:
   an airbag to be inflated and deployed in case of emergency;
   an inflator for supplying gas to the airbag;
   a retainer for supporting the inflator and the airbag; and
   a vehicle interior panel configured to allow the retainer to be latched thereto and allow the airbag to be released in a passenger compartment of a vehicle;
   wherein the vehicle interior panel is the vehicle interior panel according to claim 1.

* * * * *